(12) United States Patent
Gluckman et al.

(10) Patent No.: US 12,520,272 B2
(45) Date of Patent: Jan. 6, 2026

(54) SENSOR-BASED PRIVACY PROTECTION FOR DEVICES

(71) Applicant: Amazon Technologies, Inc., Seattle, WA (US)

(72) Inventors: Jason Gluckman, Encinitas, CA (US); Dan Gilbert Allen, Springville, UT (US); Dotan Bar-On, Rishon le Zion (IL); Johannes Obermaier, Paunzhausen (DE); Andrew James Butler, Bury St. Edmunds (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 360 days.

(21) Appl. No.: 18/124,418

(22) Filed: Mar. 21, 2023

(65) Prior Publication Data
US 2024/0323907 A1  Sep. 26, 2024

(51) Int. Cl.
*H04W 64/00* (2009.01)
*H04B 17/327* (2015.01)
*H04W 76/30* (2018.01)

(52) U.S. Cl.
CPC ........ *H04W 64/006* (2013.01); *H04B 17/327* (2015.01); *H04W 76/30* (2018.02)

(58) Field of Classification Search
CPC ... H04W 64/006; H04W 76/30; H04W 4/024; H04W 84/12; H04W 4/02; H04W 4/38; H04W 64/00; H04W 4/80; H04W 12/08; H04W 4/027; H04W 4/023; H04W 24/10; H04W 12/63; H04W 12/79; H04W 4/33; H04W 4/025; H04W 12/50; H04W 24/02; H04W 24/04; H04W 8/005; H04W 4/029; H04W 4/021; H04B 17/327; G06N 20/00; G06N 5/04; G06N 3/045; G06N 3/08; G06N 3/02; G06N 3/044; G06N 3/0464; G06N 3/04; G06N 20/10; G06N 3/082; G06N 3/088; G06N 5/01; G06N 3/09;
(Continued)

(56) References Cited

U.S. PATENT DOCUMENTS 10,909,349 B1 * 2/2021 Tripathi ................ G06T 19/00
2012/0040665 A1 * 2/2012 Liu ........................ H04W 4/48
455/426.1
(Continued)

OTHER PUBLICATIONS

Garfinkel et al.; RFID Privacy: An Overview of Problems and Proposed Solutions; Security & Privacy, IEEE, IEEE Service Center; vol. 3; No. 3; May 1, 2005; pp. 34-43; Los Alamitos, CA, US.
(Continued)

*Primary Examiner* — Nimesh Patel
(74) *Attorney, Agent, or Firm* — K&L Gates LLP

(57) ABSTRACT

Devices and techniques are generally described for sensor-based privacy protection for devices. In some examples, a first machine learning model and first data generated by the accelerometer may be used to determine that the first data corresponds to a predefined motion profile. In various examples, a first location associated with the electronic device may be determined. In some further examples, the wireless transmitter may transmit second data indicating the first location based on the determining that the first data corresponds to quadruped movement.

23 Claims, 7 Drawing Sheets

(58) Field of Classification Search
CPC .... G06N 3/0455; G06N 3/0475; G06N 3/094;
G06N 3/096; G06N 5/022; G01S 13/56;
G01S 13/003; G01S 7/415; G01S 13/765;
G01S 7/417; G01S 13/886; G01S 5/0284;
G01S 13/867; G01S 17/42; G01S 17/46;
G01S 13/42; G01S 13/50; G01S 13/58;
G01S 13/582; G01S 13/584; G01S 13/62;
G01S 13/66; G01S 13/89; G01S 19/51;
G01S 19/49; G01S 13/04; G01S 3/7864;
G01S 3/14; G01S 7/412; G06V 10/82;
G06V 10/764; G06V 20/10; G06V 20/52;
G06V 20/58; G06V 10/70; G06V 10/774;
G06V 20/64; G06V 40/172; G06V 10/95;
G06V 40/10; G06V 40/00; G06V 10/25;
G06V 40/20; G06V 20/40; G06V
2201/03; G06V 10/26; G06T 2207/20084;
G06T 2207/20081; G06T 2207/10016;
G06T 2207/30196; G06T 2207/30241;
G06T 7/70; G06T 7/292; G06T 7/73;
G06T 7/75; G06T 7/579; G06T 7/20;
G06T 2210/12; G06T 2207/30201
See application file for complete search history.

(56) References Cited

U.S. PATENT DOCUMENTS

| | | | | |
|---|---|---|---|---|
| 2013/0173455 A1* | 7/2013 | Adams | | H04B 5/00 |
| | | | | 455/41.1 |
| 2017/0078474 A1* | 3/2017 | Mahar | | H04W 48/04 |
| 2019/0259495 A1* | 8/2019 | Fridman | | G16H 40/63 |
| 2021/0136530 A1* | 5/2021 | Gobara | | H04W 76/10 |
| 2023/0091437 A1* | 3/2023 | Doken | | H04W 12/08 |
| | | | | 726/4 |

OTHER PUBLICATIONS

Author unknown; Requirements for a UICC for M2M (machine-to-machine) applications; European Telecommunications Standards Institute (ETSI); vol. SCP; Apr. 24, 2008; 11 pgs; Sophia-Antipolis ; France.

Jin et al.; RFID and E-commerce Privacy Protection;, 2009. ISCID '09. Second International Symposium on Computational Intelligence and Design; IEEE; Dec. 12, 2009; pp. 111-114; Piscataway, NJ, USA.

Mekruksavanich et al; ResNet-based Deep Neural Network using Transfer Learning for Animal Activity Recognition; 6th International Conference on Information Technology (INCIT), IEEE, Nov. 10, 2022; pp. 445-449; retrieved on Mar. 21, 2023.

Wulleme; International Search Report and Written Opinion of PCT/US2024/020095; Jun. 28, 2024; 19 pgs.

* cited by examiner

| Technology | State | Risk Score Effect |
|---|---|---|
| Accelerometer | • Inactive<br>• Active – no motion<br>• Active – quadruped<br>• Active – human<br>• Active – car<br>• Active – Abnormal motion | • +1<br>• -1<br>• -2<br>• +2<br>• +3<br>• +4 |
| Wi-Fi/BT sniffing | • inactive<br>• Active – No known Tx<br>• Active – One known Tx<br>• Active – Multiple known Tx | • +1<br>• +2<br>• -2<br>• -3 |
| GNSS | • inactive<br>• Active – No motion<br>• Active – Normal speed<br>• Active – Abnormal speed | • 0<br>• -1<br>• 0<br>• +1 |
| LoRa | • inactive<br>• Profile A<br>• Profile B | • 0<br>• +1<br>• 0 |
| Sounder/LED | • Fault<br>• No Fault | • +4<br>• 0 |

SENSOR-BASED PRIVACY PROTECTION FOR DEVICES

BACKGROUND

Various devices include sensors that may generate data representing represent some aspect of the environment in which the device is situated. For example, devices may include microphones and/or audio circuitry to capture sounds, cameras to capture image data, accelerometers to capture device acceleration, etc. In some cases, devices may include sensors and/or other technology that may be used to monitor the location of the device. For example, a device may include a Global Positioning System (GPS) receiver that may determine the location of device using satellites. In other examples, a device's location may be determined based on received signal strength of signals transmitted by the device (e.g., using various wireless communication technologies) and/or by detection of (and/or connection to) a device of known location.

BRIEF DESCRIPTION OF DRAWINGS

FIG. 3 is an example table that shows the affect on a location sharing risk score for various different sensor states, according to various aspects of the present disclosure.

DETAILED DESCRIPTION

Figure 1A:
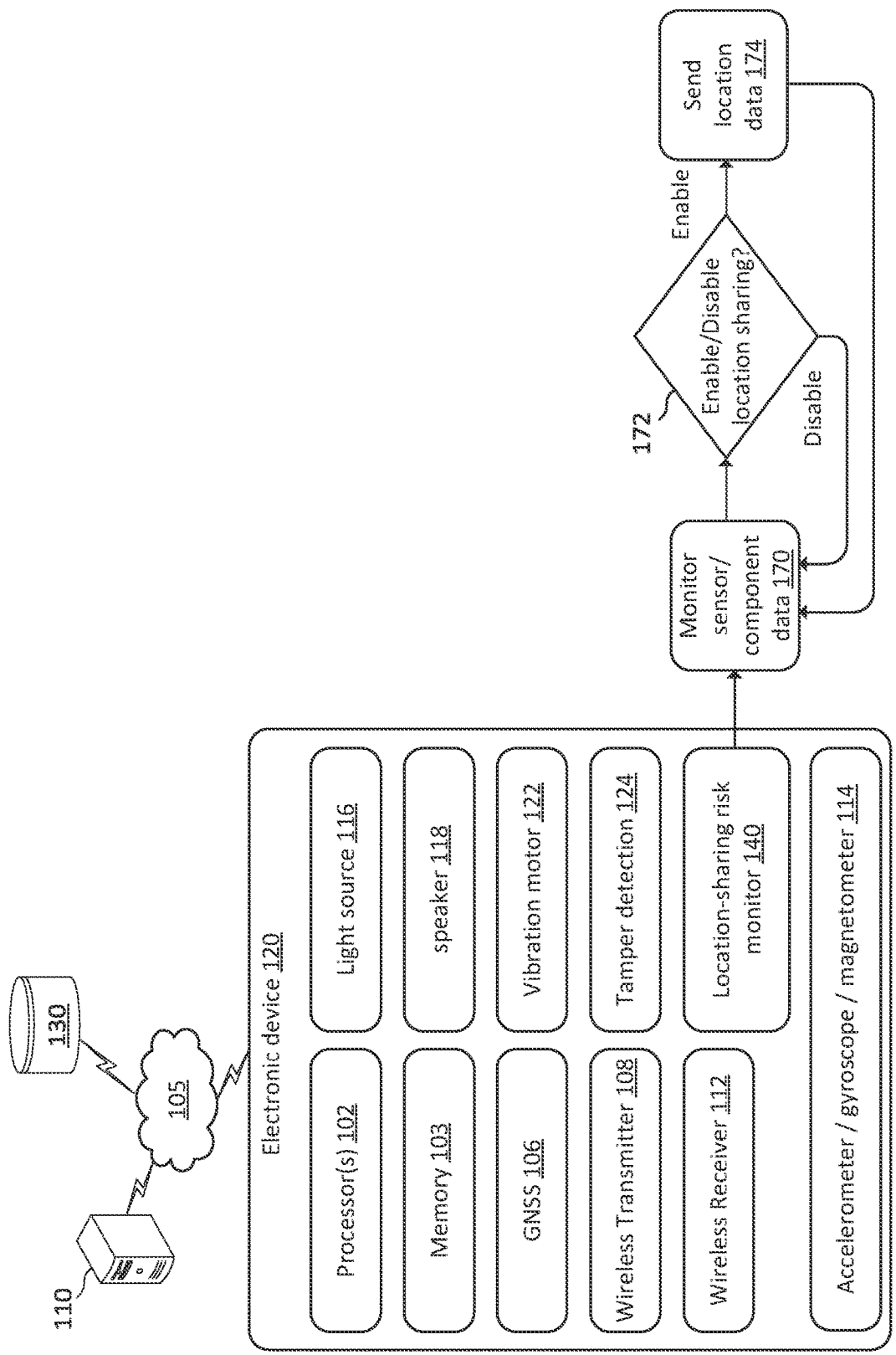
FIG. 1A is a block diagram of an example electronic device that may selectively enable and disable location sharing for privacy protection, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices that include sensing technologies are sometimes location enabled and may transit data that may be used to determine a precise or approximate location of the device. While there are many legitimate uses of such location data (e.g., pet tracking, finding personal items (e.g., car keys, wallets), etc.), such information may also be abused by bad actors and used to track individuals and/or the possessions of others without the appropriate permissions. For example, some tracking devices are relatively small, battery-powered devices that may be intended for a user to track their personal possessions or pets. However, because such devices may be concealed from easy detection, in some cases, such devices may present a risk for potential misuse. Some previous attempts to mitigate such misuse has been to enable the device to emit sounds, lights, vibrations, etc., to provide an easily-recognizable signal of the device's presence. However, battery-powered devices may have limited capability to provide a signal of sufficient magnitude to alert unwitting individuals. That is to say, the tracking device's beep may not be loud enough or the vibration may not be strong enough to alert the average individual of a concealed tracking device (sometimes referred to as a "tag"). In addition to this issue, such devices may be tampered with by malicious users to disable such alerts (e.g., by disconnecting the device's speaker, light source, and/or vibration mechanism).

Described herein are systems and techniques that may be used to selectively disable location sharing of location enabled devices to limit privacy risks associated with such devices. Some examples described herein are described in the context of a pet collar, harness, or other wearable pet tracking device. The various sensor-based privacy protection techniques and systems described herein may be used to determine whether current sensor data indicates that the device is being used in the appropriate setting (e.g., for monitoring of a pet's location) or not. If the sensor data indicates an abnormal condition and/or that the device is not likely being used for an anticipated, legitimate use (such as pet-monitoring, etc.), location sharing may be automatically disabled for the device, thereby preventing the device from being used impermissibly to track the location of a person or object. Although, in many instances the location-enabled devices herein are described as being pet tracking devices, it should be noted that the various sensor-based privacy protection techniques described herein may be used with any sensing devices and thus the techniques are not limited to any particular device type.

The various systems and techniques described herein may use input from various sensors to determine if the device remains connected to (e.g., worn by), or otherwise in the presence of the intended target (e.g., a pet). If the system determines that it has been separated from the target, either the device or a cloud-based backend system may disable reporting of certain data (e.g., location data, biometric data, etc.) in order to preserve the privacy of unintended targets around the device.

Machine learning techniques, such as those described herein, are often used to form predictions, solve problems, recognize objects in image data (or movement data) for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learning models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1A is a block diagram of an example electronic device 120 that may selectively enable and disable location sharing for privacy protection, in accordance with various aspects of the present disclosure. Although the electronic device 120 is shown with various components, it should be noted that other and/or different components apart from those specifically shown may be included in a device that may be used to selectively enable/disable sharing of certain data off-device. In the example of FIG. 1A, location sharing may be selectively enabled/disabled such that data indicating a location of the electronic device 120 may be prevented from being shared with other devices, in some cases.

In the example in FIG. 1A, electronic device 120 may include one or more processors 102 and one or more non-transitory computer-readable memories 103. The non-transitory computer-readable memories 103 may store instructions that, when executed by the one or more processors 102, may enable the electronic device 120 to perform various functionality, including decision logic to determine whether to selectively enable or disable transmission of certain data off-device (such as location data determined using a Global Positioning System (GPS) or other Global Navigation Satellite System (GNSS) 106). As used herein GNSS 106 may refer to any location data system such as GPS, Galileo, GLONASS, BeiDou, service set identifier (SSID) geolocation, optical recognition, dead-reckoning systems (that may not use geolocation), etc. In various examples, the electronic device 120 may communicate with one or more remote computing devices 110 over a network 105. Network 105 may be, for example, a wide area network (a WAN, such as the Internet), a local area network (LAN), or some combination of a WAN and a LAN. In various examples, electronic device 120 may include a wireless transmitter 108 and/or a wireless receiver 112 that may be effective to send and receive, respectively, wireless radio signals. Accordingly, in at least some examples, data may be transmitted wirelessly between electronic device 120 and remote computing device 110, over network 105, using wireless transmitter 108 and/or wireless receiver 112.

In various examples, remote computing device(s) 110 and/or electronic device 120 may be configured in communication (e.g., over network 105) with additional non-transitory computer-readable media 130. In an example, the additional non-transitory computer-readable media 130 may be distributed storage that may be accessible by the electronic device 120 and/or the remote computing device(s) 110 over network 105. In other examples, the additional non-transitory computer-readable media 130 may be at least partially integrated into one or more of electronic device 120 and/or the remote computing device(s) 110.

GNSS component 106 (e.g., any component that may be used to determine a device's location, such as GPS) may determine location data of the electronic device 120. Location data may include latitude, longitude, altitude, date/time, and/or other data depending on the particular sensor. In various examples, the electronic device 120 may include a speaker 118 (and audio circuitry configured to drive the speaker 118), a light source 116 (e.g., one or more light emitting diodes (LEDs)), and/or a vibration motor 122. In some examples, the speaker 118, light source 116, and/or vibration motor 122 may be privacy mechanisms that may periodically emit sound, light, or vibration (respectively) to alert a person of the presence of the electronic device 120. For example, these components may act as safety components in case a bad actor were to attempt to use the electronic device 120 as an unlawful tracking device (e.g., by hiding the device in an individual's bag, clothing, vehicle, etc.). The speaker 118, light source 116, and/or vibration motor 122 may alert a person to the presence of the electronic device 120. However, in some cases, such components may be disabled by a bad actor so that they may become non-functional. Accordingly, the electronic device 120 may be equipped with other components that may be used to selectively disable sharing of certain data if a determination is made that the electronic device 120 is being used in an abnormal and/or unauthorized manner.

For example, the electronic device 120 may include a location-sharing risk monitor 140. Although in the example of FIG. 1, the location-sharing risk monitor 140 is described in the context of selectively enabling/disabling sharing of location data, it should be noted that the location-sharing risk monitor 140 may be used to selectively enable/disable sharing of any other type of data, as desired. Accordingly, while the examples herein principally describe selectively enabling/disabling sharing of location data, these techniques are also applicable to other sorts of data.

One or more of an accelerometer, gyroscope, and/or magnetometer (component(s) 114) may be included in the electronic device 120. An accelerometer may be used to measure acceleration, which is the rate of change in the velocity of the electronic device 120. The accelerometer may be used to detect the orientation of the electronic device 120 relative to the Earth's gravity, as well as to detect motion and/or vibration. As described in further detail below, the acceleration data provided by the accelerometer may be used to determine the type of movement experienced by the electronic device 120. For example, the acceleration data may be determined to correspond to one or more predefined motion profiles that may be characteristic of different types of motion. For example, accelerometer data may be used to distinguish between a running person and a walking person based on the correspondence of the accelerometer data to the motion profile of a running person or the motion profile of a walking person. In another example, the accelerometer data may be used to distinguish between bipedal movement (e.g., human movement) and quadruped movement (e.g., cat, dog, goat, movement).

Gyroscopes measure angular velocity, which is the rate of change of an object's orientation. Gyroscopes may be used to detect rotation and/or changes in orientation of the electronic device 120. Magnetometers measure the strength and direction of magnetic fields and can be used as a compass to determine the direction a device is oriented (e.g., facing). In combination, an accelerometer, gyroscope, and magnetometer can provide a rich set of data about the electronic device 120's orientation, movement, and/or surroundings.

Tamper detection 124 may be a component (e.g., hardware, software, and/or some combination thereof) that detects whether the electronic device 120 has been tampered with. For example, tamper detection 124 may include a circuit that detects whether circuitry for the speaker 118, light source 116, and/or vibration motor 122 have been disconnected. Generally, tamper detection 124 may be used to detect tampering with the electronic device 120 (e.g., the circuitry, casing, software, etc.). Although the specific example in FIG. 1A depicts a device having light source 116, speaker 118, and vibration motor 122 (which may be used for tamper detection), it should be noted that other components may be used in addition to, or instead of, these components, as desired. Any desired tamper detection methodology and/or hardware may be used according to the desired implementation. Upon detection of tampering, tamper detection 124 may send data to the location-sharing risk monitor 140 indicating the tampering and/or the type of tampering.

Location-sharing risk monitor 140 may evaluate the various sensor data to make a determination as to the relative risk of sending certain types of data (e.g., location data determined using GNSS component 106, biometric data, etc.) off device (e.g., using wireless transmitter 108). Various examples of different architectures of the location-sharing risk monitor 140 are described herein. Additionally, different example signals and/or metrics that may be used to determine a relative risk level are described. However, it should be appreciated that the implementation and/or the input signals and/or sensor data that are considered in order to perform the evaluation may vary according to the desired implementation.

In an example implementation in which the electronic device 120 is a pet collar or other pet tracking device, location-sharing risk monitor 140 may include a supervised machine learning model that may be trained to predict whether motion data corresponds to quadruped movement or to human or other types of movement (e.g., movement indicative of an automobile, train, bicycle, etc.). The machine learning model may be, for example, a multilayer perceptron, a neural network, a convolutional neural network, a transformer-based model, etc. The machine learning model may be trained using training data that pairs movement information (e.g., accelerometer data) with ground truth labels that classify the particular movement information as pertaining to a particular class (e.g., quadruped movement, biped movement, dog movement, cat movement, human movement, automobile movement, bicycle movement, and/or any other class that may be of interest according to the desired implementation).

In one implementation, action 170 (monitor sensor/component data), the location-sharing risk monitor 140 may continuously, periodically (or otherwise, such as upon detecting movement using accelerometer data) use the trained machine learning model to classify the type of movement detected using the accelerometer data (and/or other sensor/component data) as input. In the example implementation, location sharing may be enabled at action 172 if the accelerometer data indicates quadruped motion (e.g., with a sufficiently high confidence score output by the trained model). Location data may be sent at action 174 (e.g., transmitted by wireless transmitter 108 to a companion application, cloud server executed by remote computing device(s) 110, etc.). As previously described, the location data may be determined using GNSS component 106 that is a component of the electronic device 120 (and/or by virtue of short-range wireless communication (e.g., Bluetooth®) between the electronic device 120 and one or more nearby devices that include GPS/GNSS).

In the current example, a pet owner may track the location of the pet using the location data (e.g., to find a lost pet and/or to check on the pet's location). Conversely, if, at action 170, a determination is made that the accelerometer data indicates human motion, bicycle motion, automobile motion, or some other class of motion apart from quadruped motion, location sharing may be disabled at action 172. In such a scenario, the electronic device 120 may prevent transmission of current location data to mitigate privacy/security risks. The general idea is that if the movement by the pet tracker electronic device 120 corresponds to legitimate pet motion, location data may be shared. However, if the movement by the pet tracker electronic device 120 does not correspond to legitimate pet motion, location data should not be shared to mitigate privacy/security risks. In an example, a dog wearing the pet tracker electronic device 120 may be traveling in a vehicle, and thus the accelerometer data profile may correspond to automobile motion (e.g., non-quadruped motion) and location sharing may be disabled. However, when the dog exits the vehicle and begins moving around, the motion profile determined using the accelerometer data will again resemble a motion profile characteristic of quadruped motion and the dog's location data may be shared.

The foregoing example uses a machine learning model and accelerometer data to make a decision concerning whether to enable or disable location sharing. However, other signals may be used in addition to, or instead of, accelerometer data. Additionally, rule-based systems (e.g., heuristics and/or decision trees) may be used instead of, or in addition to, a machine learning architecture to decide whether to enable/disable location sharing.

For example, received signal strength indicator (RSSI) values may be routinely generated by the circuitry of the wireless receiver 112, a receiver of the GNSS component 106, and/or of another wireless interface of the electronic device 120. Generally, antennas of such wireless interfaces are tuned for their particular environments to improve signal to noise ratio (SNR) and/or the quality of wireless communication generally. RSSI values may accordingly be generated by the chipset used for the wireless receiver 112. When the electronic device 120 is worn (e.g., in a collar, harness, etc.) by a pet, the antennas of the wireless interfaces of electronic device 120 will be tuned for that particular environment. However, if the electronic device 120 were to be removed from the pet (e.g., to be used for improper purposes as a tracking device), the RSSI values will drop rapidly as the electronic device 120 is moved away from the pet's body into a different environment. In some examples, the location-sharing risk monitor 140 may monitor RSSI values (e.g., at action 170) and may disable location sharing (at action 172) when the RSSI values experience a significant decline over a short period of time (indicating that the electronic device 120 has been removed from the pet). For example, if the RSSI values decline by greater than a threshold amount in a given period of time, location sharing may be disabled.

In various examples, an owner of the pet/electronic device 120 may be prompted to reset the location sharing of the electronic device 120 upon disablement due to various factors. For example, if a decline in RSSI values causes location sharing to be disabled, a user may be prompted via a companion application to perform a particular action in order to re-enable location sharing. For example, the user may be required to rotate the pet collar in a specific manner (monitored using accelerometer data) in order to re-enable location sharing. In another example, the user may be required to press a button or flip a switch on the electronic device 120 to re-enable location sharing. This may be used to ensure that the electronic device 120 is being used for proper pet-monitoring purposes and/or to verify that the electronic device 120 is in the possession of the registered user. Once the RSSI drop triggers disablement of location sharing, the user may be required to reset the device before location sharing can be re-enabled. In other examples, an event that triggers disablement of location sharing may be associated with a time to live (TTL) or decay value. Upon expiration of the TTL, location sharing may be re-enabled provided that the condition that resulted in its disablement no longer persists.

Location sharing may be enabled by location-sharing risk monitor 140 (e.g., at action 172) due to "green light" conditions. The examples of green light conditions are implementation-dependent and may vary. However, some examples may include normal/stable RSSI values, detection of quadruped motion, stable capacitance values, data indicating no tampering, image data captured by a device camera indicating expected conditions (e.g., some portion of a pet is visible), stable temperature values, connection to one or more known (e.g., registered) devices (e.g., Wi-Fi connection, short-range wireless connection (Bluetooth®), etc.), a velocity being less than or equal to a maximum pet velocity, etc. Other sensor data apart from those specifically mentioned may also be used in accordance with the desired implementation. In some examples, location sharing may be enabled while the green light conditions persist until some "red light" condition and/or combination of "red light" conditions is detected (or more generally until a level of risk that the device is being used in an abnormal way exceeds some threshold level of risk).

Red light conditions may include detection of human motion (or some other non-quadruped motion, such as automobile motion), changing temperature conditions, rapid drops in RSSI values and/or capacitance, velocity exceeding an expected pet velocity or threshold velocity (e.g., >35 mph), image data captured by a device camera indicating abnormal conditions, wireless connection to one or more unknown devices, etc. A red light condition or combination of red light conditions may cause location sharing to be disabled by the location-sharing risk monitor 140.

As described in further detail below, in some examples, green light events and red light events may be used to generate a score. Different events may be scored differently and/or may be associated with different decay values and/or TTL values. An overall score may be generated and used to determine an overall level of risk. The overall level of risk may be compared to a risk threshold (or may be used as an input to a risk assessment algorithm such as a CNN and/or other machine learning algorithm) and may be used to determine whether to enable/disable location sharing. For example, in the implementation shown in FIG. 3, lower scores may be associated with green light conditions while higher scores may be associated with red light conditions. Various sensor data (e.g., see the "State" column in the table 300 depicted in FIG. 3) may be considered and the scores (e.g., parameter values) associated with the values of the various sensors may be combined (e.g., added) and the combined score may be compared to a threshold to determine whether to enable/disable location sharing (or sharing of other potentially-sensitive data). In some other examples, the various parameter values may be input into a neural network or other machine learning model that may be trained to generate an overall risk score and/or to selectively enable/disable location sharing (or sharing of other data). In some examples, as a particular parameter's TTL value expires, that parameter may no longer be taken into account when determining the overall score or the value of the parameter may change (e.g., decrease). In other examples, the scores for individual parameters may decay as the information becomes stale over time. For example, an event indicating a decrease in temperature may initially be associated with a risk score effect of +3 at time $t_0$. However, at time $t_1$ this parameter value may be associated with a reduced risk score effect of +2. At time $t_2$ this parameter value may be associated with a further reduced risk score effect of +1, and so on. Some parameter values and/or state change events may be associated with infinite TTLs (no decay) and may require an active device reset. For example, if the accelerometer data indicates human motion over a certain period of time, location sharing (and/or other data sharing) may be disabled until the device is manually reset, as previously described.

In addition to the above-described security enhancements, various other security and/or anti-tampering measures may be used in various desired implementations of tamper detection 124. Examples may include separating the hardware board and/or components onto different sections of the device (e.g., dog collar or harness). This may make the device bulkier and more difficult to conceal for illicit purposes. Additionally, combining the two board halves into a smaller, more concealable device may require soldering which may appear tampered to a casual observer, thus helping mitigate the potential for misuse.

In some examples, the accelerometer may detect vibrations from the vibration motor 122 (or other vibrating component) to ensure that the vibration motor 122 is still part of the device (e.g., an anti-tampering technique). In another example, the casing of the electronic device 120 may have a specific resonance frequency that may be measured using the accelerometer. If the casing is tampered with, the resonance frequency may change and this data may be used to disable location sharing. Potting may also be added to the casing to make internal manipulations more difficult. In some other examples, pins and/or buttons may be added such that when the buttons/pins are released (due to opening the case) the pins/buttons cut power and disable device booting (if powered down).

In another example, light sensors (e.g., photo diodes) may be added to the casing. If light is detected, it indicates that the case has been opened (tampering). In another example, the photo diodes may be used to check whether the visual indicator/LED is still present. In other examples, the device may measure the impedance (resistance, capacitance, and/or inductance (or a combination thereof)) of important traces. If the change in impedance is above a threshold, the device has been manipulated and location sharing (and/or sharing of other data) may be disabled. The traces may be included in the collar or placed on the circuit board. For example, resistors and/or capacitors may be embedded into the collar/harness. In another example, the device may monitor current consumption when using an anti-tampering buzzer (from speaker 118). If the current is too low or too high it may indicate tampering.

In various examples, if tampering is detected, the device may be permanently disabled by burning a control bit in a hardware e-fuse of the chip. If a recoverable state is desired, the user may be required to present proof of physical possession of the device (e.g., rotate the device in specific orientations measured via the accelerometer, use of a touch screen selectable control (or other selectable control) to verify possession, etc.).

Figure 1B:
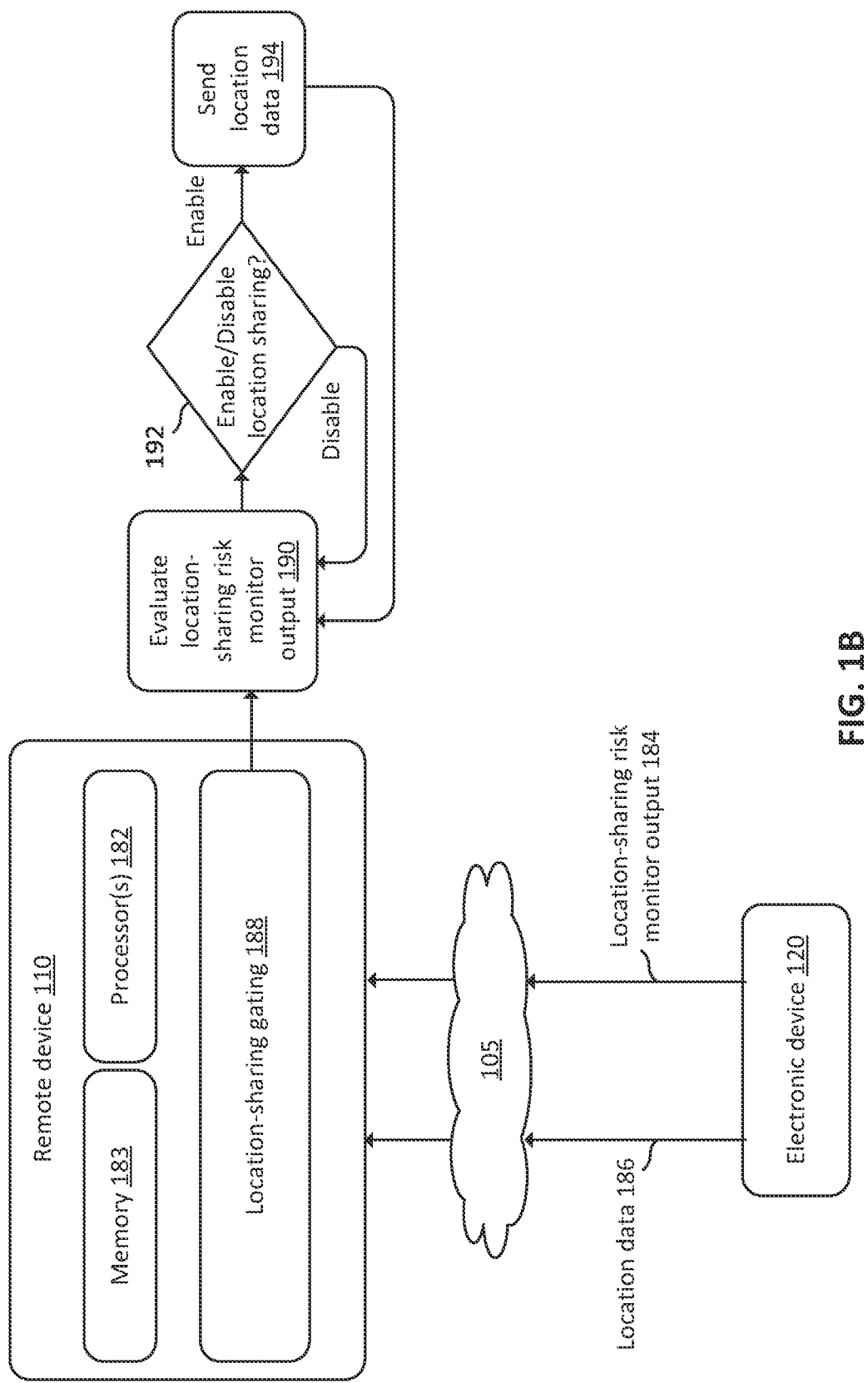
FIG. 1B is a block diagram depicting an example where the electronic device of FIG. 1A communicates with a remote device that may selectively enable and disable location sharing for privacy protection, in accordance with another aspect of the present disclosure.

FIG. 1B is a block diagram depicting an example where the electronic device 120 of FIG. 1A communicates with a remote computing device 110 that may selectively enable and disable location sharing for privacy protection, in accordance with another aspect of the present disclosure.

In various examples, instead of making a local, edge-device determination of whether to selectively enable/disable location sharing (or other data sharing), data may be sent to a remote computing device 110 (e.g., a cloud-based device with which the edge device (e.g., electronic device 120) is registered and/or communicating). For example, as shown in FIG. 1, the electronic device 120 may send location data 186 to the remote computing device 110 via network 105. In addition, the electronic device 120 may share the location-sharing risk monitor output 184 (e.g., a risk score, combined risk score, and/or machine learning model output, as described above) output by the locally-executed location-sharing risk monitor 140 (FIG. 1A) with the remote computing device 110.

The remote computing device 110 may include one or more memories (e.g., including memory 183) configured in communication with one or more processors 182. The remote computing device 110 may receive the location data 186 and/or the location-sharing risk monitor output 184. Location-sharing gating 188 may be a process whereby the remote computing device 110 evaluates various data received from the electronic device 120 to determine whether to share location data 186 and/or other data received from electronic device 120 with one or more other devices (e.g., such as a user's mobile device that is registered with electronic device 120). In this example, the location data 186 has been shared with the remote computing device 110 and remote computing device 110 may perform location-sharing gating 188 to decide whether such location data (or other data) should be shared with other devices. In one example, this architecture may be advantageous in a scenario where misuse is detected with a high degree of confidence so that the appropriate authorities may be notified and/or so that the target of the misuse may be located and/or informed that they may be being tracked or otherwise be the victim of privacy invasion.

In various examples, the location-sharing gating 188 may include evaluation of the location-sharing risk monitor output 190 (e.g., the combined risk scores and/or confidence levels output by the machine learning model executing on the electronic device 120). The form of the location-sharing risk monitor output 184 depends on the specific implementation of the location-sharing risk monitor 140, and may vary from implementation to implementation. In various examples, the location-sharing gating 188 may compare the machine learning model output and/or the risk scores (e.g., parameter values) to one or more threshold values to determine whether to selectively enable/disable location sharing (action 192). If location sharing is enabled (due to normal device usage and green light conditions), the remote computing device 110 may send the location data (and/or other data) to registered devices (at action 194). Conversely, if location sharing is disabled at action 192, remote computing device 110 may not share the location data (and/or other data) with any other devices and in some cases may provide an alert (e.g., causing the electronic device to emit a buzzer sound, light, vibration and/or alerting law enforcement).

Figure 2:
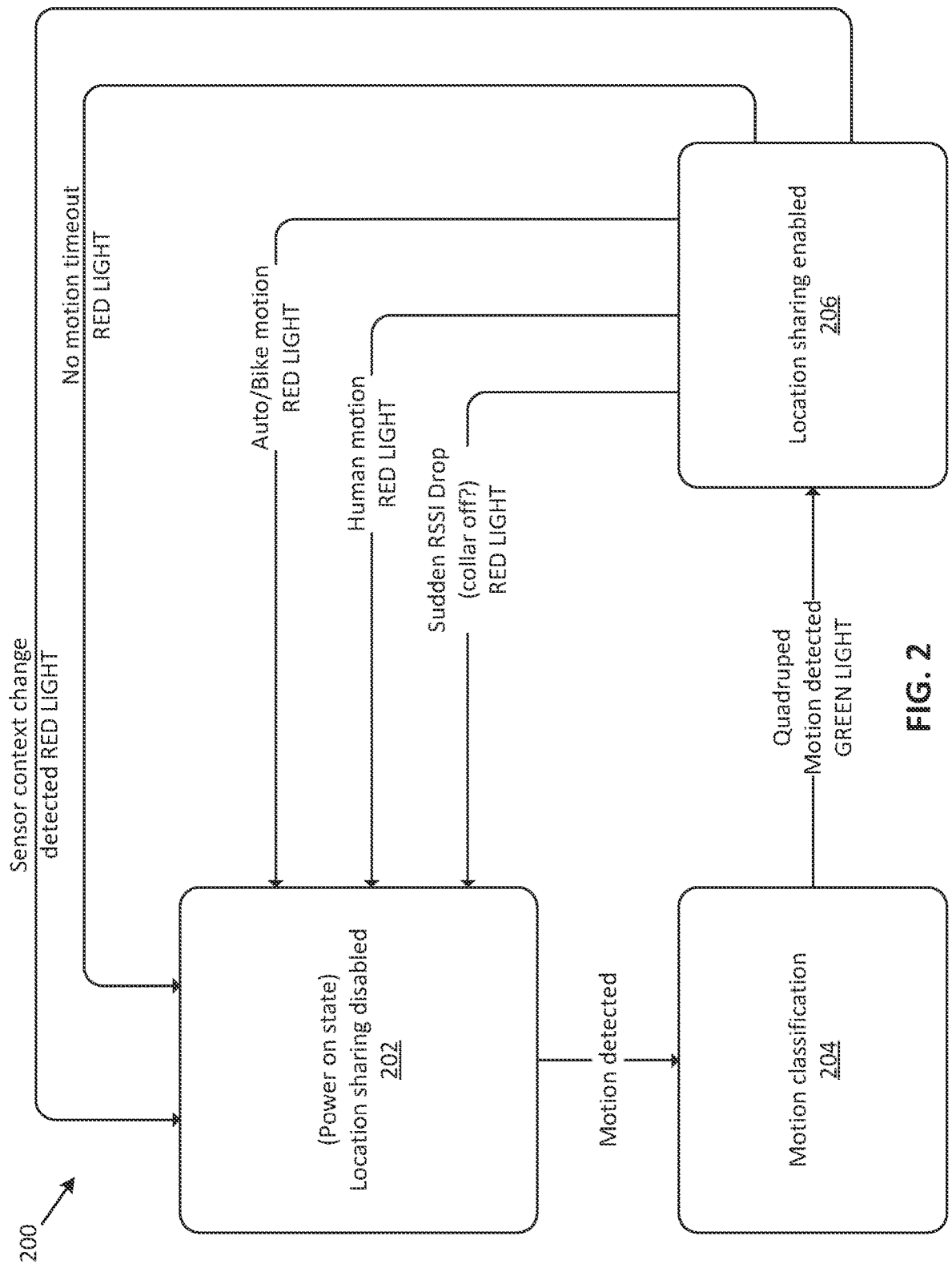
FIG. 2 illustrates an example location reporting decision diagram that may be used to selectively enable/disable location sharing, in accordance with various aspects of the present disclosure.

FIG. 2 illustrates an example location reporting decision diagram 200 that may be used to selectively enable/disable location sharing, in accordance with various aspects of the present disclosure. The processing flow in diagram 200 may initially start at state 202 upon powering up the device (e.g., electronic device 120). Initially, location sharing may be disabled. In the example in FIG. 2, upon detection of motion (e.g., using the accelerometer and/or the GPS/GNSS), the motion may be classified at state 204 (e.g., using the aforementioned machine learning architecture) and/or by comparing the motion data to characteristic motion profiles (e.g., of dogs, humans, automobiles, etc.) in order to classify the motion.

In the example of FIG. 2, if motion classification state 204 results in the green light condition of quadruped motion detected, the electronic device 120 may transition to the location-sharing enabled state 206. Accordingly, the electronic device 120 (or the remote computing device 110, depending on the implementation) may share location data determined by the GPS/GNSS of the electronic device 120. In some examples, the electronic device 120 may remain in the location sharing enabled state 206 until one or more red light conditions occur. Various example red light conditions are depicted in FIG. 2. However, as previously noted, it may be some combination of these red light conditions (whether implemented in a rule-based architecture or a machine learning architecture) that causes transition between the location sharing enabled state 206 and the location sharing disabled state 202. The examples of red light states in diagram 200 include a sensor context change detected (e.g., a drop in temperature from a temperature sensor, a drop in capacitance, etc.), a detection of automobile/bicycle motion, a no-motion timeout (e.g., where no motion has been detected for greater than a threshold amount of time). Note that disabling location sharing due to such a motion timeout has little drawback as, in a proper pet tracking use case, when the pet begins to move again (such as after sleeping), the detected motion will be classified as quadruped motion and location sharing may be re-enabled. Further, since there is no change in location while the pet is immobile, there is little harm in disabling location sharing during periods of non-motion. Further examples of red light states in diagram 200 include a detection of human motion and a sudden RSSI drop (indicating that the collar may have been removed from the pet). Another potential red light example (not shown in FIG. 2) may be a determination that the device has been tampered with or that the device is moving at a speed that is greater than a speed at which a pet can travel (such as when the device is transported in a vehicle). As previously described, the particular signals and/or sensors or other components from which the signals are determined may vary according to the desired implementation.

FIG. 3 is an example table 300 that shows the affect on a location sharing risk score for various different sensor states, according to various aspects of the present disclosure. The example table 300 of FIG. 3 depicts various sensors/components (in the "Technology" column), various states that may be detected using data from a respective technology, and an affect on a risk score resulting from such a state. In the example table 300 in FIG. 3, lower risk scores may be indicative of proper device usage (and may lead to a green light state), whereas higher risk scores may be indicative of higher risk of improper device usage (and may lead to a red light state). The total risk score generated using a table like table 300 may be compared against a threshold value to determine whether to selectively enable or disable location sharing (or sharing of other potentially sensitive data).

Although not shown in table 300, various states may be associated with different TTL values and/or decay parameters, such that the risk score effect's contribution to the total risk score may be removed after the TTL has expired and/or may decay in accordance with the decay parameter.

It should be noted that a table 300 and/or the logic represented by such a table may not be used in all implementations of the various systems and techniques described herein. For example, instead of calculating an overall risk score based on various states as shown and described in reference to FIG. 3, sensor data output by various sensors of the electronic device (e.g., accelerometer data, GPS data, temperature data, etc.) may instead be input into a machine learning model that may be trained to determine an overall risk score and/or whether to selectively enable/disable location sharing (or other data sharing).

The states associated with the accelerometer generally lower the risk score when the accelerometer data indicates usage associated with a quadruped pet and raises the risk score when the accelerometer data indicates other, abnormal usage (e.g., human motion, vehicle motion, etc.). Wi-Fi/Bluetooth® sniffing may refer to beacon and/or connection signals with nearby devices. Generally, if the electronic device 120 is near one or more known devices (e.g., registered devices associated with the pet owner's family) the risk score is lower. Conversely, the risk score is higher if the electronic device 120 is not near any known/registered devices.

The LoRa modulation profile may be another signal that may be used to approximate the risk of the device being used improperly. Additionally, the sounder/LED may be used to detect tampering. As shown, detection of a fault (e.g., possible tampering) has a significant effect on the risk score. Finally, in the example table 300, GNSS data may be used to detect the velocity (speed) at which the electronic device 120 is moving, with abnormal speeds indicating increased risk. The particular values (e.g., risk score effects) and/or the particular risk score thresholds that may be used to selectively enable/disable location sharing may vary according to the desired implementation.

Figure 4:
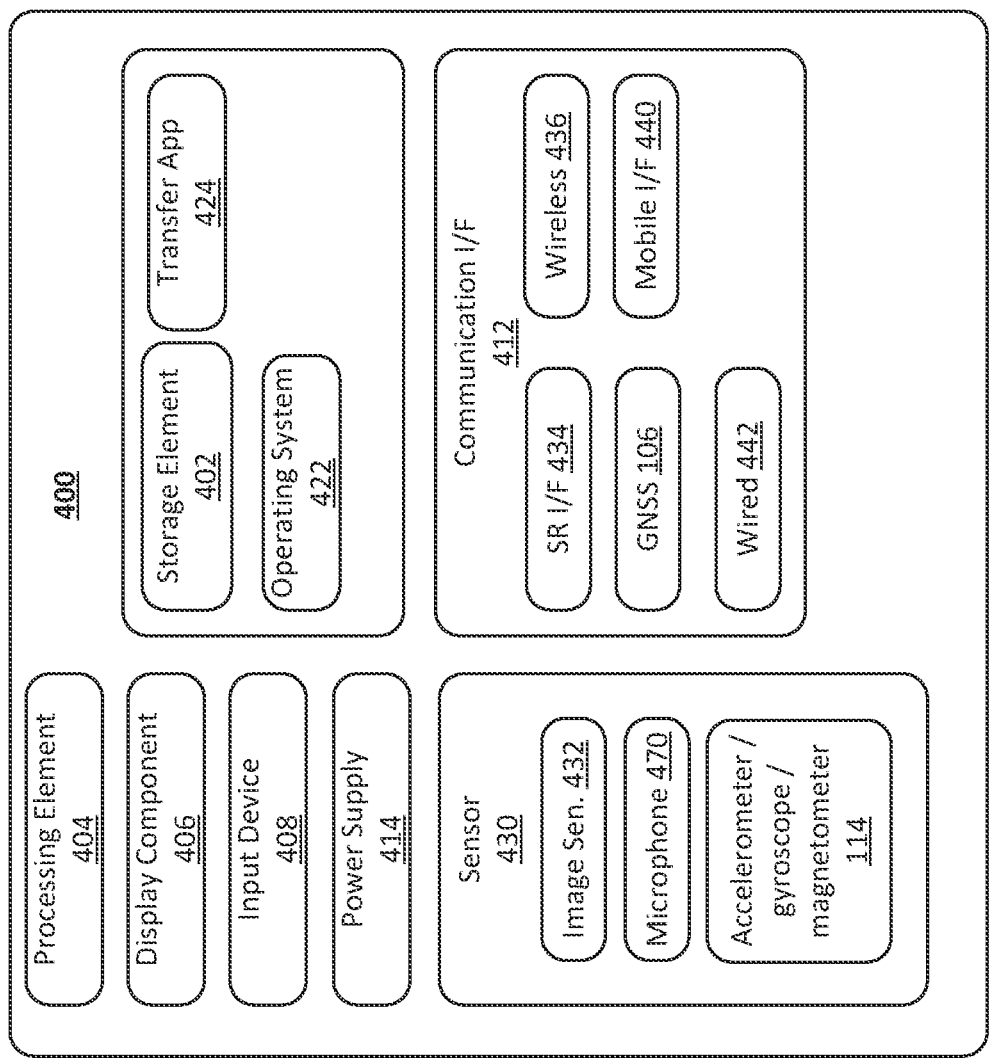
FIG. 4 is a block diagram showing an example architecture of a computing device that may be used in accordance with various aspects described herein.

FIG. 4 is a block diagram showing an example architecture 400 of a computing device that may be used to provide sensor-based privacy protection, in accordance with various aspects of the present disclosure. For example, the architecture 400 may be an example architecture of an electronic device 120 and/or a remote computing device 110 (with additional, fewer, and/or different components). It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 105, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, Zigbee, etc. A mobile interface 440 may be configured to communicate utilizing a cellular or other mobile protocol. A Global Positioning System (GPS) and/or other GNSS component 106 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information. In various examples, the sensors 430 may include one or more of an accelerometer, a gyroscope, and/or a magnetometer (components 114).

As noted above, multiple devices may be employed in a single system. In such a multi-device system, each of the devices may include different components for performing different aspects of the system's processing. The multiple devices may include overlapping components. The components of the computing device(s), as described herein, are exemplary, and may be located as a stand-alone device or may be included, in whole or in part, as a component of a larger device or system.

Figure 5:
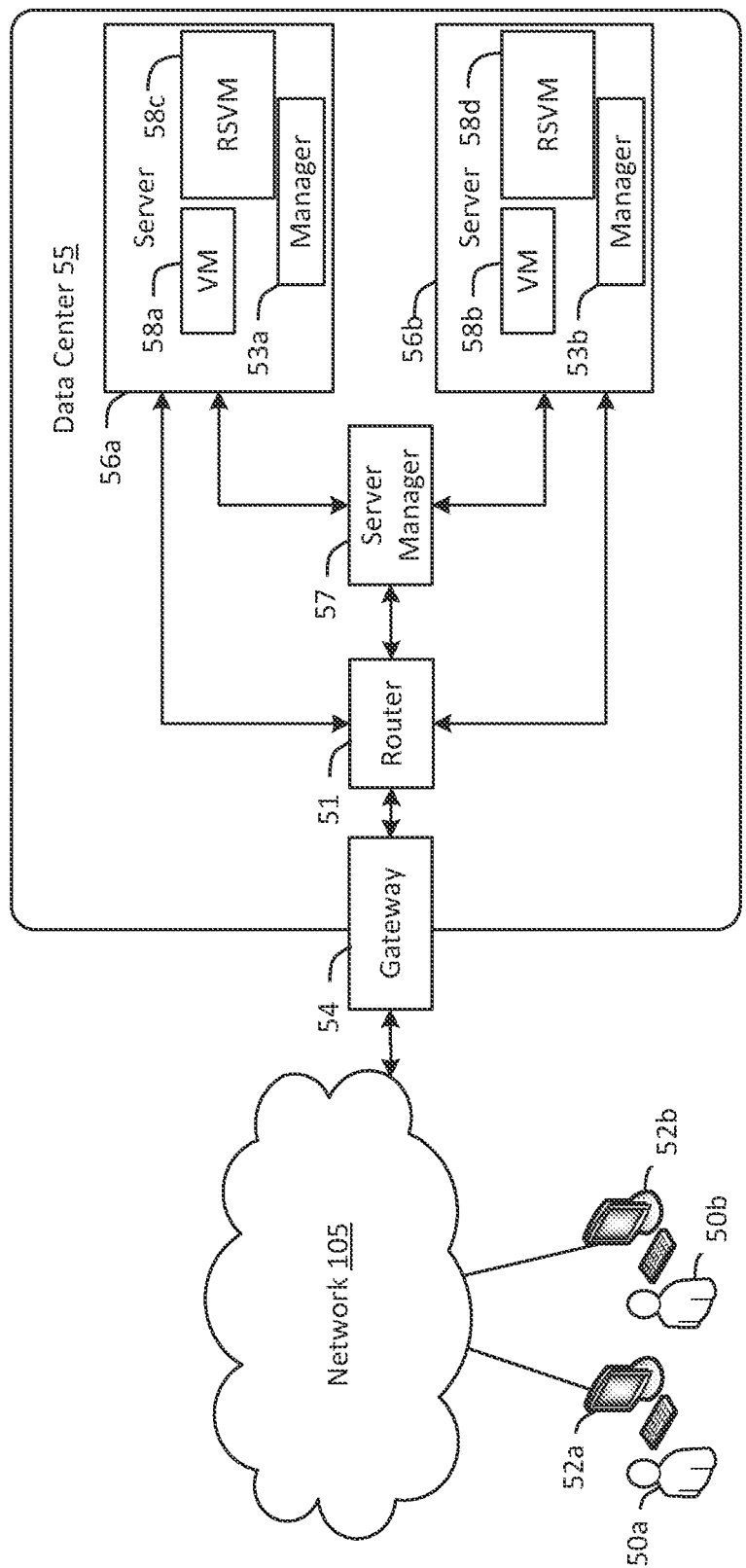
FIG. 5 is a diagram illustrating an example system for sending and providing data that may be used in accordance with the present disclosure.

An example system for sending and providing data will now be described in detail. In particular, FIG. 5 illustrates an example computing environment in which the embodiments described herein may be implemented. For example, the computing environment of FIG. 5 may be an example of a computing environment that may provide sensor-based privacy protection, as described herein. FIG. 5 is a diagram schematically illustrating an example of a data center 55 that can provide computing resources to users 50a and 50b (which may be referred herein singularly as user 50 or in the plural as users 50) via user computers 52a and 52b (which may be referred herein singularly as user computer 52 or in the plural as user computers 52) via network 105. Data center 55 may be configured to provide computing resources for executing applications on a permanent or an as-needed basis. The computing resources provided by data center 55 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 55 may include servers 56a and 56b (which may be referred herein singularly as server 56 or in the plural as servers 56) that provide computing resources. These resources may be available as bare metal resources or as virtual machine instances 58a-d (which may be referred herein singularly as virtual machine instance 58 or in the plural as virtual machine instances 58). In at least some examples, server manager 57 may control operation of and/or maintain servers 56. Virtual machine instances 58c and 58d are rendition switching virtual machine ("RSVM") instances. The RSVM virtual machine instances 58c and 58d may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 105 may, for example, be a publicly accessible network of linked networks and possibly operated by various distinct parties, such as the Internet. In other embodiments, network 105 may be a private network, such as a corporate or university network that is wholly or partially inaccessible to non-privileged users. In still other embodiments, network 105 may include one or more private networks with access to and/or from the Internet.

Network 105 may provide access to user computers 52. User computers 52 may be computers utilized by users 50 or other customers of data center 55. For instance, user computer 52a or 52b may be a server, a desktop or laptop personal computer, a tablet computer, a wireless telephone, a personal digital assistant (PDA), an e-book reader, a game console, a set-top box or any other computing device capable of accessing data center 55. User computer 52a or 52b may connect directly to the Internet (e.g., via a cable modem or a Digital Subscriber Line (DSL)). Although only two user computers 52a and 52b are depicted, it should be appreciated that there may be multiple user computers.

User computers 52 may also be utilized to configure aspects of the computing resources provided by data center 55. In this regard, data center 55 might provide a gateway or web interface through which aspects of its operation may be configured through the use of a web browser application program executing on user computer 52. Alternately, a stand-alone application program executing on user computer 52 might access an application programming interface (API) exposed by data center 55 for performing the configuration operations. Other mechanisms for configuring the operation of various web services available at data center 55 might also be utilized.

Servers 56 shown in FIG. 5 may be servers configured appropriately for providing the computing resources described above and may provide computing resources for executing one or more web services and/or applications. In one embodiment, the computing resources may be virtual machine instances 58. In the example of virtual machine instances, each of the servers 56 may be configured to execute an instance manager 53a or 53b (which may be referred herein singularly as instance manager 53 or in the plural as instance managers 53) capable of executing the virtual machine instances 58. The instance managers 53 may be a virtual machine monitor (VMM) or another type of program configured to enable the execution of virtual machine instances 58 on server 56, for example. As discussed above, each of the virtual machine instances 58 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 55 shown in FIG. 5, a router 51 may be utilized to interconnect the servers 56a and 56b. Router 51 may also be connected to gateway 54, which is connected to network 105. Router 51 may be connected to one or more load balancers, and alone or in combination may manage communications within networks in data center 55, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 55 shown in FIG. 5, a data center 55 is also employed to at least in part direct various communications to, from and/or between servers 56a and 56b. While FIG. 5 depicts router 51 positioned between gateway 54 and data center 55, this is merely an exemplary configuration. In some cases, for example, data center 55 may be positioned between gateway 54 and router 51. Data center 55 may, in some cases, examine portions of incoming communications from user computers 52 to determine one or more appropriate servers 56 to receive and/or process the incoming communications. Data center 55 may determine appropriate servers to receive and/or process the incoming communications based on factors such as an identity, location or other attributes associated with user computers 52, a nature of a task with which the communications are associated, a priority of a task with which the communications are associated, a duration of a task with which the communications are associated, a size and/or estimated resource usage of a task with which the communications are associated and many other factors. Data center 55 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 55 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 6:
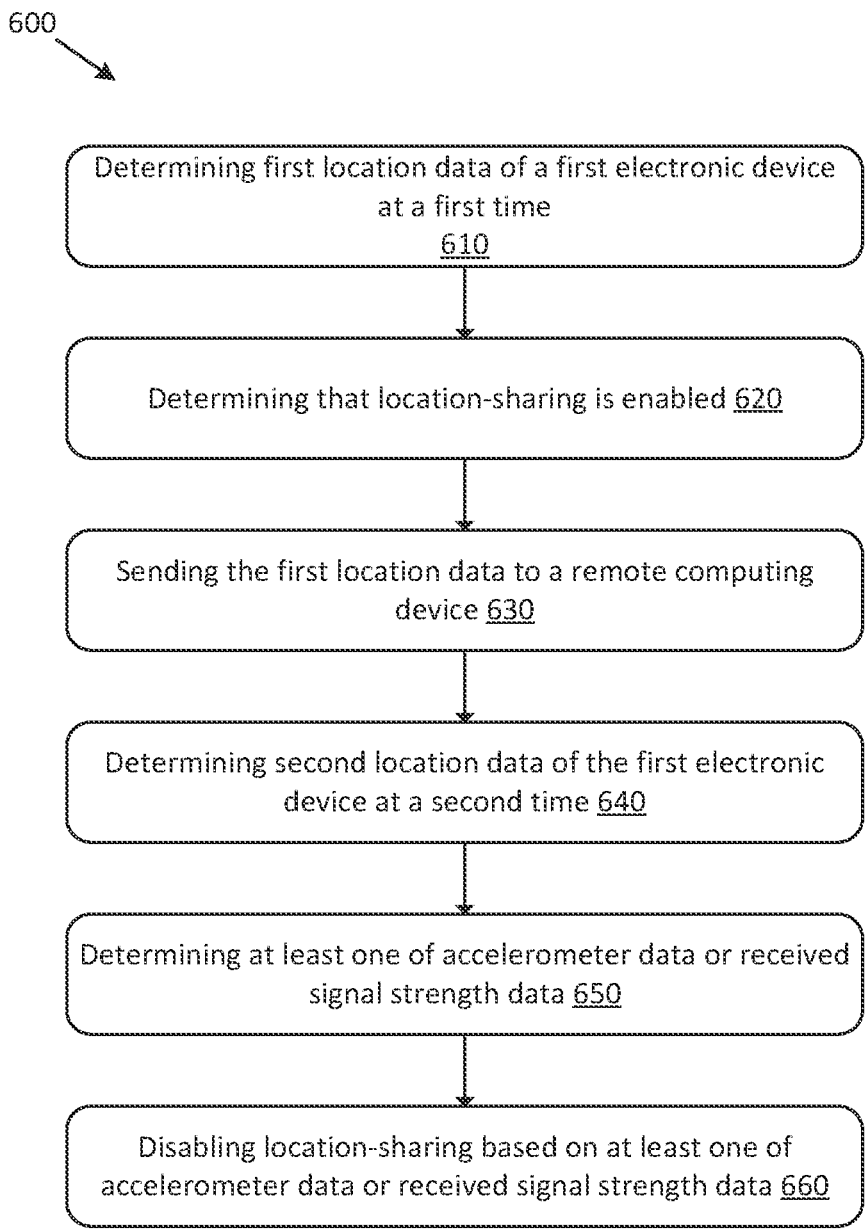
FIG. 6 is an example flow chart depicting an example process for sensor-based privacy protection, in accordance with various aspects of the present disclosure.

FIG. 6 is flow chart describing an example process 600 that may be used for or sensor-based privacy protection, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units (e.g., CPUs, GPUs, tensor processors, etc.) of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the various techniques described herein.

Processing may begin at action 610, at which first location data of a first electronic device may be determined at a first time. For example, the GNSS component 106 may be used to determine a first location of electronic device 120 at a given time.

Processing may continue at action 620, at which a determination may be made that location sharing is currently enabled. For example, as described herein, electronic device 120 may include logic and/or hardware effective to selectively disable location data sharing (or sharing of other data) on the basis of information provided by different sensors and/or components of the electronic device 120. For example, location-sharing risk monitor 140 may determine that location sharing (or other data sharing) is currently enabled.

Processing may continue at action 630, at which the first location data may be sent to a remote computing device. For example, wireless transmitter 108 may be used to send the current location data to one or more computing devices, such as remote computing device 110 as a consequence of location sharing being currently enabled.

Processing may continue at action 640, at which second location data of the first electronic device may be determined at a second time. For example, at some time after the first time, second location data may be determined for the electronic device using the GNSS component 106.

Processing may continue at action 650, at which at least one of accelerometer data or received signal strength data (RSSI data) may be received. The accelerometer may be on the device that is evaluating the location sharing risk (e.g., electronic device 120). Similarly, the RSSI data may be associated with the wireless receiver 112 (which may be any type of radio receiver, including a Bluetooth or Wi-Fi receiver), a receiver of the GNSS component 106, and/or some other receiver of the electronic device 120 that is evaluating the location sharing risk.

Processing may continue at action 660, at which location sharing (or other data sharing) may be disabled by the device (e.g., electronic device 120) based on at least one of the accelerometer data or the RSSI data. For example, if the accelerometer data indicates motion that is uncharacteristic of the relevant device (e.g., human motion, automobile motion) location sharing may be disabled. In another example, a sudden drop in RSSI values may indicate that the device has been removed from a pet and may trigger disablement of location sharing. Various other examples of architectures and/or signals that may be used to selectively enable/disable location data sharing (or other data sharing) are described throughout the disclosure.

In accordance with one or more preferred implementations, an electronic device comprises a sensor, a wireless transmitter, one or more processors, and one or more computer-readable media storing computer executable instructions that, when executed by the one or more processors, cause the one or more processors to perform operations comprising: determining a first location associated with the electronic device; transmitting, using the wireless transmitter, first data indicating the first location; based on sensor data generated by the sensor, updating a first parameter; comparing a value of the first parameter to a threshold; and based on the comparing of the value of the first parameter to the threshold, transmitting, using the wireless transmitter, second data indicating whether to share location information for the electronic device.

In accordance with one or more preferred implementations an electronic device includes a sensor, a wireless transmitter, one or more processors, and one or more computer readable media storing computer executable instructions that, when executed by the one or more processors, cause the one or more processors to perform operations comprising: based on sensor data generated by the sensor, updating a first parameter; comparing a value of the first parameter to a threshold; determining a first location associated with the electronic device; and based on the comparing of the value of the first parameter to the threshold, transmitting, using the wireless transmitter, location data indicating the first location.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An electronic device comprising:
   an accelerometer;
   a wireless transmitter;
   one or more processors; and
   one or more computer-readable media storing computer executable instructions that, when executed by the one or more processors, cause the one or more processors to perform operations comprising:
      determining, using a first machine learning model and first data generated by the accelerometer, that the first data corresponds to quadruped movement,
      determining a first location associated with the electronic device, and
      based on the determining that the first data corresponds to quadruped movement, transmitting, using the wireless transmitter, second data indicating the first location.

2. The electronic device of claim 1, the one or more computer-readable media storing further instructions that, when executed by the one or more processors, cause the one or more processors to perform further operations comprising:
   determining a short-range wireless connection to a first computing device, wherein the first computing device is associated with the electronic device, and
   based on the determining of the short-range wireless connection, disabling transmission of location data.

3. The electronic device of claim 1, further comprising a Global Positioning System (GPS) receiver, wherein the one or more computer-readable media store further instructions that, when executed by the one or more processors, cause the one or more processors to perform further operations comprising:
　determining, based on third data generated by the GPS receiver, that a velocity associated with the electronic device is above a threshold velocity associated with quadruped motion, and
　disabling transmission of location data while the velocity is above the threshold velocity.

4. The electronic device of claim 1, further comprising a wireless receiver, wherein the one or more computer-readable media store further instructions that, when executed by the one or more processors, cause the one or more processors to perform further operations comprising:
　determining a first received signal strength indicator (RSSI) value associated with the wireless receiver at a first time, wherein the electronic device is associated with the first location at the first time,
　transmitting, using the wireless transmitter, third data indicating the first location,
　determining a second location associated with the electronic device at a second time,
　determining a second RSSI value associated with the wireless receiver at the second time, wherein the second RSSI value is less than the first RSSI value, and
　disabling transmission of location data based at least in part on the second RSSI value being less than the first RSSI value.

5. The electronic device of claim 1, further comprising an output component comprising at least one of a speaker, a light-emitting component, or a vibrating component;
　wherein the one or more computer-readable media store further instructions that, when executed by the one or more processors, cause the one or more processors to perform further operations comprising:
　　determining that the output component has been disabled, and
　　disabling transmission of location data based at least in part on the determining that the output component has been disabled.

6. The electronic device of claim 5, further comprising:
　causing a prompt to be displayed on the electronic device or on another device, wherein the prompt instructs a user to orient the electronic device in a first direction to re-enable transmission of location data;
　detecting, by the accelerometer, that the electronic device has been oriented in the first direction; and
　transmitting, using the wireless transmitter, third data indicating a location of the electronic device.

7. The electronic device of claim 1, the one or more computer-readable media storing further instructions that, when executed by the one or more processors, cause the one or more processors to perform further operations comprising:
　determining a second location associated with the electronic device at a first time,
　determining, using the first machine learning model and third data generated by the accelerometer at the first time, that the third data does not correspond to quadruped movement,
　determining a third location associated with the electronic device at a second time,
　determining, using the first machine learning model and fourth data generated by the accelerometer at the second time, that the fourth data corresponds to quadruped movement, and
　based on the determining that the fourth data corresponds to quadruped movement, transmitting, using the wireless transmitter, fifth data indicating the third location.

8. The electronic device of claim 1, the one or more computer-readable media storing further instructions that, when executed by the one or more processors, cause the one or more processors to perform further operations comprising:
　determining, using the first machine learning model and third data generated by the accelerometer, that the third data does not correspond to quadruped movement,
　disabling transmission of location data by the electronic device,
　detecting, by the one or more processors, a first reset signal,
　determining, using the first machine learning model and fourth data generated by the accelerometer, that the fourth data corresponds to quadruped movement, and
　transmitting, using the wireless transmitter, the location data based at least in part on the determining that the fourth data corresponds to quadruped movement and further based at least in part on the first reset signal.

9. The electronic device of claim 1, the one or more computer-readable media storing further instructions that, when executed by the one or more processors, cause the one or more processors to perform further operations comprising:
　determining a first state during which transmission of location data by the wireless transmitter is inhibited based at least in part on second data generated by the accelerometer,
　disabling transmission of location data by the wireless transmitter, and
　enabling transmission of the location data based at least in part on a time-to-live (TTL) value associated with the first state.

10. A method comprising:
　determining that sensor data generated by one or more sensors of a first device is indicative of motion in accordance with a first motion profile, wherein the first motion profile is representative of a first predefined type of motion;
　determining second data indicating a first location associated with the first device; and
　based on the determining that the sensor data is indicative of movement in accordance with the first motion profile, sending the second data indicating the first location to a second device.

11. The method of claim 10, further comprising:
　determining, by the first device, a short-range wireless connection to a second device; and
　disabling transmission of location data to the second device while the short-range wireless connection to the second device persists.

12. The method of claim 10, further comprising:
　determining, by the first sensor of the first device or a second sensor of the first device, third data representing a velocity of the first device; and
　disabling transmission of location data by the first device while the velocity of the first device exceeds a threshold velocity that is associated with quadruped movement.

13. The method of claim 10, further comprising:
　determining a first received signal strength indicator (RSSI) value associated with a wireless receiver of the first device at a first time; and sending, using a wireless transmitter, the second data indicating the first location based at least in part on the first RSSI value.

14. The method of claim 10, further comprising:
determining that the first device has experienced tampering; and
disabling location sharing by the first device based at least in part on the determining that the first device has experienced tampering.

15. The method of claim 10, further comprising:
determining, by the first sensor of the first device, third data representing second motion;
determining that the third data is indicative of motion in accordance with a second motion profile; and
based on the determining that the third data is indicative of motion in accordance with a second motion profile disabling location sharing by the first device.

16. The method of claim 10, further comprising:
determining a first condition of the first device at a first time, the first condition associated with a first time to live (TTL) value; and
disabling the location sharing by the first device during a first time period that is commensurate with the first TTL value.

17. An electronic device comprising:
an accelerometer;
a wireless transmitter;
one or more processors; and
one or more computer readable media storing computer executable instructions that, when executed by the one or more processors, cause the one or more processors to perform operations comprising:
  determining a first location associated with the electronic device,
  transmitting, using the wireless transmitter, first data indicating the first location,
  determining, using a first machine learning model and second data generated by the accelerometer, whether the second data corresponds to quadruped movement, and
  based on the determining whether the second data corresponds to quadruped movement, transmitting, using the wireless transmitter, third data indicating whether to share location information for the electronic device.

18. The electronic device of claim 17, wherein the wireless transmitter operates at frequencies less than 1 GHz.

19. The electronic device of claim 17, wherein the electronic device comprises a global navigation satellite system (GNSS) receiver, and wherein the first location is determined using the GNSS receiver.

20. The electronic device of claim 17, wherein the one or more computer readable media store computer executable instructions that, when executed by the one or more processors, cause the one or more processors to perform operations comprising
  determining, using the first machine learning model and the second data generated by the accelerometer, that the second data corresponds to quadruped movement, and
  based on the determining that the second data corresponds to quadruped movement, transmitting, using the wireless transmitter, third data indicating to share location information for the electronic device.

21. The electronic device of claim 17, wherein the third data comprises a Boolean flag.

22. The electronic device of claim 17, wherein the third data indicates that movement of the electronic device corresponds to quadruped movement.

23. The electronic device of claim 17, wherein the one or more computer readable media store computer executable instructions that, when executed by the one or more processors, cause the one or more processors to perform operations comprising
  determining, using the first machine learning model and the second data generated by the accelerometer, that the second data corresponds to a first class associated with quadruped movement.

* * * * *